I'lll US009722392B2

(12) United States Patent
Bhawalkar et al.

(10) Patent No.: US 9,722,392 B2
(45) Date of Patent: Aug. 1, 2017

(54) LASER SYSTEMS AND RELATED METHODS

(71) Applicant: Candela Corporation, Wayland, MA (US)

(72) Inventors: Jayant D. Bhawalkar, Auburndale, MA (US); Xiaoming Shang, Lexington, MA (US); Jinze Qiu, Natick, MA (US); Christopher J. Jones, Leicester, MA (US); James Hsia, Weston, MA (US)

(73) Assignee: Candela Corporation, Wayland, MA (US)

( * ) Notice: Subject to any disclaimer, the term of this patent is extended or adjusted under 35 U.S.C. 154(b) by 0 days.

(21) Appl. No.: 15/035,765

(22) PCT Filed: Nov. 19, 2014

(86) PCT No.: PCT/US2014/066259
§ 371 (c)(1),
(2) Date: May 11, 2016

(87) PCT Pub. No.: WO2015/080907
PCT Pub. Date: Jun. 4, 2015

(65) Prior Publication Data
US 2016/0294152 A1   Oct. 6, 2016

Related U.S. Application Data

(60) Provisional application No. 61/910,043, filed on Nov. 28, 2013.

(51) Int. Cl.
*H01S 3/16* (2006.01)
*H01S 3/08* (2006.01)
(Continued)

(52) U.S. Cl.
CPC ............ *H01S 3/1633* (2013.01); *H01S 3/061* (2013.01); *H01S 3/0627* (2013.01);
(Continued)

(58) Field of Classification Search
CPC .. H01S 3/1633; H01S 3/1115; H01S 3/06754; H01S 3/092; H01S 3/109;
(Continued)

(56) References Cited

U.S. PATENT DOCUMENTS 6,295,161 B1    9/2001  Bazzocchi
7,386,019 B2 *  6/2008  Klimov ............... H01S 3/09415
                                                    372/18
(Continued)

FOREIGN PATENT DOCUMENTS

DE      102010045184 A1   3/2012

OTHER PUBLICATIONS

Peuser et al. (Compact, passively Q-switched, all-solid-state mater oscillator-power amplifier-optical parametric oscillator (MOPA-OPO) system pumped by a fiber-coupled diode laser generating high brightness, tunable, ultraviolet radiation), Jul. 1, 2009/ vol. 48, No. 19/ Applied Optics.*
(Continued)

*Primary Examiner* — Dung Nguyen
(74) *Attorney, Agent, or Firm* — Manelli Selter PLLC.; Edward J. Stemberger

(57) ABSTRACT

A MOPA laser system that includes a seed laser configured to output pulsed laser light, an amplifier configured to receive and amplify the pulsed laser light emitted by the seed laser; and a pump laser configured to deliver a pump laser beam to both the seed laser and the amplifier.

19 Claims, 8 Drawing Sheets

(51) Int. Cl.
*H01S 3/131* (2006.01)
*H01S 3/23* (2006.01)
*H01S 3/067* (2006.01)
*H01S 3/092* (2006.01)
*H01S 3/109* (2006.01)
*H01S 3/11* (2006.01)
H01S 3/06 (2006.01)
H01S 3/094 (2006.01)
H01S 3/10 (2006.01)
H01S 3/113 (2006.01)
H01S 3/00 (2006.01)

(52) U.S. Cl.
CPC ...... *H01S 3/06754* (2013.01); *H01S 3/08081* (2013.01); *H01S 3/092* (2013.01); *H01S 3/094061* (2013.01); *H01S 3/094069* (2013.01); *H01S 3/109* (2013.01); *H01S 3/1115* (2013.01); *H01S 3/1312* (2013.01); *H01S 3/1611* (2013.01); *H01S 3/1643* (2013.01); *H01S 3/2308* (2013.01); H01S 3/0092 (2013.01); H01S 3/0617 (2013.01); H01S 3/0625 (2013.01); H01S 3/094053 (2013.01); H01S 3/10023 (2013.01); H01S 3/113 (2013.01); H01S 2301/02 (2013.01)

(58) Field of Classification Search
CPC ...... H01S 3/1611; H01S 3/061; H01S 3/1312; H01S 3/2308; H01S 3/094061; H01S 3/08081; H01S 3/1643; H01S 3/0627; H01S 3/0617; H01S 3/0092; H01S 3/113; H01S 3/10
See application file for complete search history.

(56) References Cited

U.S. PATENT DOCUMENTS

2005/0265678 A1 12/2005 Manyam
2009/0227995 A1 9/2009 Bhawalkar et al.
2012/0312267 A1 12/2012 Ridderbusch

OTHER PUBLICATIONS

International Preliminary Report on Patentability in PCT/US2014/066259 dated Jun. 9, 2016.
Bernstein et al., "Treatmetn of tattoos with a 755-nm Q-switched alexandrite laser and novel 1064 nm and 532 nm Nd:YAG laser Handpieces pumped by the alexandrite treatment beam", Journal of Drugs in Dermatology, vol. 9, No. 11, Nov. 1, 2010, pp. 1333-1339.
Pueser et al., "compact, passively Q-switched, all-solid-state master oscillator-power amplifier-optical parametric oscillator (MOPA-OPO) system pumped by a fiber-coupled diode laser generating high-brightness, tunable, ultraviolet radiation", Applied Optics, Optical Society of America, Washington, DC; US, vol. 48, No. 19 Jul. 1, 2009, pp. 3839-3845.
International Search Report & Written Opinion in PCT/US2014/066259 dated Jul. 13, 2015.

* cited by examiner

LASER SYSTEMS AND RELATED METHODS

TECHNOLOGY FIELD

The present disclosure relates to laser systems and related methods. In particular, the present disclosure relates to laser systems and related methods for use in, for example, generating high-energy, sub-nanosecond pulses.

DESCRIPTION OF RELATED ART

Lasers are used in numerous applications in industry, research and medicine. Of special interest are lasers generating high energy and short duration pulses, for example, nanosecond and sub-nanosecond pulses. Such lasers would facilitate micro-processing applications of some precision materials. Such lasers could also address a number of scientific and technological applications, as well as certain medical procedures, where the short interaction time with the work piece or tissue can reduce heating effects and improve the interaction quality.

Q-switched solid state lasers are currently used to generate short duration laser pulses. These pulses typical could have durations as short as a few nanoseconds, although reports of shorter pulses tested in laboratory conditions exist. A special type of Q-switched laser, commonly called microchip lasers, which have very short resonators (few millimeters) can generate sub-nanosecond pulses. However, such devices typically can only provide pulse energies of less than 1 millijoule (mJ).

Master Oscillator Power Amplifier (MOPA) systems are also used to generate sub-nanosecond, high-energy laser pulses. Usually, a MOPA includes two pump lasers with one pump laser pumping the master oscillator and the other pump laser pumping the power amplifier. For proper MOPA operation, the pumping sources must be closely synchronized. The synchronization, however, requires complicated electronic systems.

MOPA systems, especially ones with high amplifier gain, are sensitive to parasitic reflections, which can lead to problems of self-lasing. Self-lasing may severely limit the amplification achievable in the power amplifier. The feedback sensitivity of these parasitic reflections is usually cured only by placing a Faraday isolator between the master oscillator (MO), also sometimes termed as a seed laser, and the power amplifier (PA), also sometimes termed as an amplifier. Particularly for high-power pulsed devices, this may introduce serious limitations. Moreover, the complexity and cost of such MOPA systems are high, and the output energy is often low.

The gain achievable in a power amplifier is often severely limited by amplified spontaneous emission (ASE). Gains higher than those limited by ASE are usually achieved by use of power amplifiers having multiple stages with optical isolation between the stages. This may further complicate the design of the power amplifiers and increase its cost.

SUMMARY

Therefore, various exemplary embodiments of the present disclosure relate to improved laser systems and related methods that may overcome one or more drawbacks or problems discussed above.

To attain the advantages and in accordance with the present disclosure, as embodied and broadly described herein, one exemplary aspect of the present disclosure may provide a MOPA laser system configured to generate high-power, sub-nanosecond laser pulses with output pulse energy exceeding 100 mJ. The laser system may include a seed laser configured to output pulsed laser light with pulse energy exceeding 5 mJ, an amplifier with gain of less than 100 configured to receive the pulsed laser light emitted by the seed laser and amplify it. The use of an energetic seed laser may reduce the gain requirement to less than 100 in the amplifier such that a relatively simple amplifier could be used to generate output energies up to 5 J.

According to another exemplary aspect, careful selection of the pump source wavelength, the doping concentration and the length of the seed laser gain medium, the pump beam intensity, the cross-sectional diameter of the active pumped region, and/or the diameter of the gain medium may facilitate achievement of greater than 5 mJ output energy in the sub-nanosecond seed laser. This selection of parameters may also be of help in overcoming limitations that could be imposed by amplified spontaneous emission.

In one example, the seed laser could be pumped by diode lasers and the amplifier could be pumped with flash lamps or a solid state pump laser. Alternatively, both the seed laser and the amplifier could be pumped by a single solid state pump laser. Pumping the seed laser and the amplifier with a single laser may obviate the need of separate pump sources and the need for electronic synchronization of the separate pump sources.

In some exemplary aspects, the solid state pump laser may be configured to provide simultaneously pump laser beam to both the seed laser and the amplifier. The pump laser could be an Alexandrite laser pumped by one or more flash lamps, which may be configured to generate pulse energies greater than 1 J with pulse durations shorter than 0.2 millisecond (msec) at 755 nm and pump a Nd:YAG MOPA configured to generate an output at a wavelength of 1064 nm. The pump laser beam emitted by the single pump laser may be coupled to a multimode optical fiber and similar multimode optical fibers to deliver or conduct the pump laser beam to the seed laser and the amplifier. The length of the multimode optical fibers delivering pump energy to the seed laser and to the amplifier can be selected to mode-scramble the pumping energy such as to provide a homogenous pumping energy distribution at the output of the multimode optical fibers. This may render the seed laser and the amplifier insensitive to output beam quality fluctuations in the pump laser. Use of a single pump laser may also support automatic synchronization of the seed laser and the amplifier.

In another exemplary aspect, the seed laser may include a gain medium configured to output pulsed laser light and a passive Q-switch. The seed laser gain medium can be a short Nd:YAG rod or plate. The length of the seed laser Nd:YAG rod could be selected to be long enough to reduce gain in transverse dimension and to reduce amplified spontaneous emission. Additionally, the length of the seed laser Nd:YAG rod could be selected to be short enough to support generation of sub-nanosecond pulses. The Nd concentration could be chosen so that significant portion of the pump laser beam can be absorbed in the rod. The cross-sectional diameter of the pumped region in the seed laser and the pump beam intensity could be chosen to facilitate the generation of the required output energy while minimizing the effects of ASE.

According to one exemplary aspect, use of an unstable resonator may prevent occurrence of hot spots in a seed laser beam. A saturable absorber or a Faraday rotator optical isolator placed between the seed laser and the amplifier may prevent self-lasing.

In some exemplary aspects, the amplifier may include a Nd:YAG rod, a coupling lens that couples the seed laser beam to the Nd:YAG rod, and a dichroic mirror. The dichroic mirror may be configured to reflect the laser beam amplified by the amplifier and transmit a pumping beam generated by the single pump laser. To minimize amplified spontaneous emission, the gain per unit amplifier rod length may be kept small. In one exemplary embodiment, the Nd:YAG rod length may be greater than 2 cm, preferably greater than 4 cm. Also to minimize amplified spontaneous emission, the Nd:YAG rod could have a diameter significantly larger than the diameter of the pumped region within constraints imposed by the cost of the rod. The diameter could preferably be greater than 1 cm. Such relation between the Nd:YAG rod diameter and the diameter of the pumped region may minimize amplified spontaneous emission that could be caused by reflections from a barrel surface of the Nd:YAG rod.

In another exemplary aspect, the seed laser beam may be amplified in the amplifier in a single pass. The seed laser emitted beam and the pump beam may be counter-propagating in the Nd:YAG rod of the amplifier. The amplifier may output laser beam in a pulse mode at a wavelength of 1064 nm with energy of up to 5 J per pulse. The pulse duration may be from about 10 psec to about 900 psec. The gain in the amplifier is about 100 or less.

Alternatively, one can use a single optical fiber to deliver both the pump laser beam and the seed laser beam to the amplifier. Use of a single optical fiber may enable optical alignment and spatial overlap between the seed laser beam and the pumped gain region in the amplifying device. In this case, the seed laser beam and the amplifier pump beam may be co-propagating in the amplifier. This arrangement may also facilitate the placement of the amplifying device remotely from the seed laser, for example, within the beam delivery system for bringing the output beam to the work material or target tissue. This may eliminate the need for a maneuverable free space beam delivery system, such as an articulated arm with multiple mirrors in order to flexibly bring the beam to the work material.

According to one exemplary aspect, the MOPA may include at least one energy sensor configured to detect laser energy radiated by the seed laser and/or by the amplifier and an electronic mechanism. The electronic mechanism may be configured to ensure a single output laser pulse by terminating the flash lamp drive current in the pump laser upon optical detection of an output pulse from at least one of a group of the seed laser and the amplifier.

The MOPA system may also include a MOPA output laser beam shaping and frequency multiplying segments. The MOPA output laser beam shaping optics could be, for example, a reverse Galilean optical system. Other optical system configured to facilitate formation on the work material of a laser spot of about 3 mm to 6 mm could be used. A saturable absorber, such as a Cr:YAG absorber, could be used to prevent self-lasing mode of operation and minimize ASE that could be caused by reflections from the work material. An off-axis reflective optical element such as a 90 degree parabolic mirror could also be used in the MOPA output beam shaping optics or beam delivery system to minimize reflected light from going back into the amplifier.

Optionally, the MOPA output laser beam shaping optics could include at least one laser beam frequency doubling device configured to receive the output laser beam with wavelength of 1064 nm and double the frequency such as to produce an output laser beam with wavelength of 532 nm.

An optical fiber could be used to couple the seed laser beam to the amplifier. The fiber optics coupling may support remote location of the amplifier together with the output laser beam shaping and frequency multiplying components.

DESCRIPTION OF DISCLOSED EMBODIMENTS

Reference will now be made in detail to the exemplary embodiments of the invention, examples of which are illustrated in the accompanying drawings. Wherever possible, the same reference numbers will be used throughout the drawings to refer to the same or like parts.

FIGS. 1-8 illustrate various exemplary embodiments of a high-energy, sub-nanosecond laser. The term "high-energy, sub-nanosecond laser," as used herein, may refer to a laser that can provide an energy of 0.1 to 10 J with pulse duration of 10 to 900 psec. In general, a high-energy, sub-nanosecond laser can provide, for example, more effective micro machining, scientific spectroscopy, and medical treatments than a nanosecond laser commonly used. Accordingly, availability of a high-energy, sub-nanosecond laser may facilitate improvement of the existing applications and support development of new laser applications.

Microchip lasers are frequently used to "seed" the amplifying devices. ASE typically limits the output of a microchip laser to less than 1 mJ. Availability of a microchip laser with output energy greater than 5 mJ in the sub-nanosecond seed laser could support increase of the seed laser energy and contribute to reduction of the amplifier gain.

Figure 1:
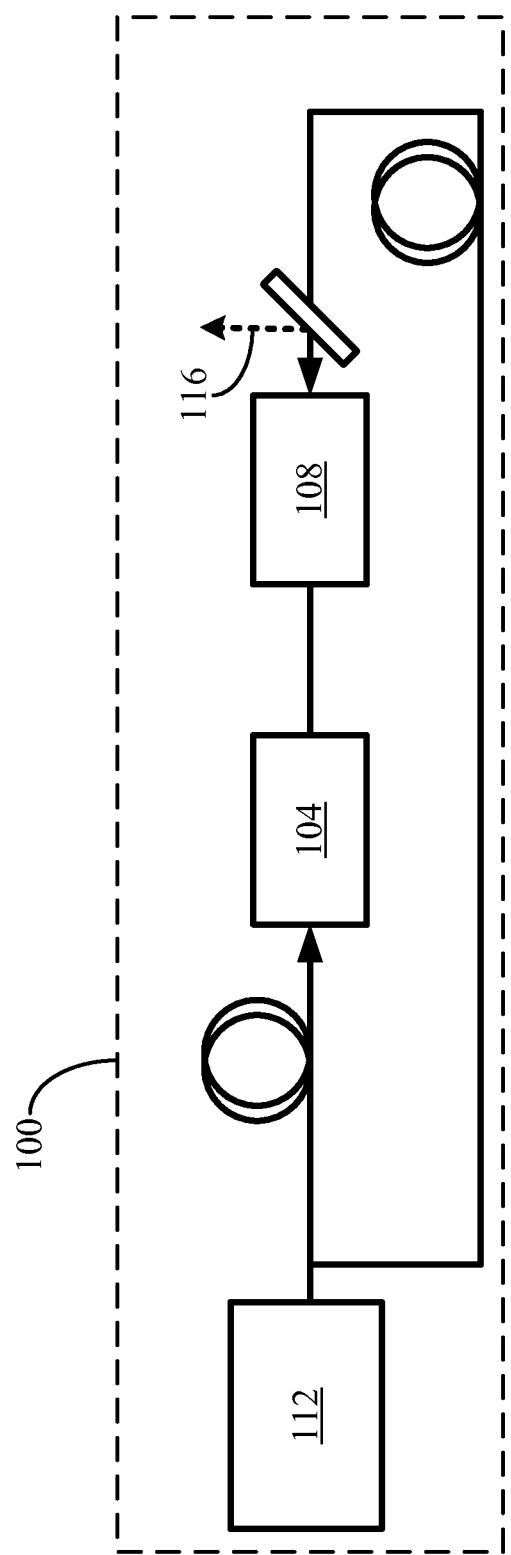
FIG. 1 is a schematic illustration of a MOPA laser system according to one exemplary embodiment of the present disclosure.

FIG. 1 is a schematic illustration of a high-energy, sub-nanosecond laser system 100 according to one exemplary embodiment of the present disclosure. Laser system 100 is generally a MOPA system that comprises a seed laser 104, an amplification device or amplifier 108, and a pump laser 112. Seed laser 104 may be configured to output pulsed laser light towards amplifier 108. Amplifier 108 may be configured to amplify the pulsed laser light received from seed laser 104. Pump laser 112 may be a solid state laser configured to pump laser beam to both seed laser 104 and amplifier 108. In some exemplary embodiments, pump laser 112 may provide the pump laser beam to seed laser 104 and amplifier 108 simultaneously. Reference numeral 116 marks a MOPA output laser beam.

Figure 2:
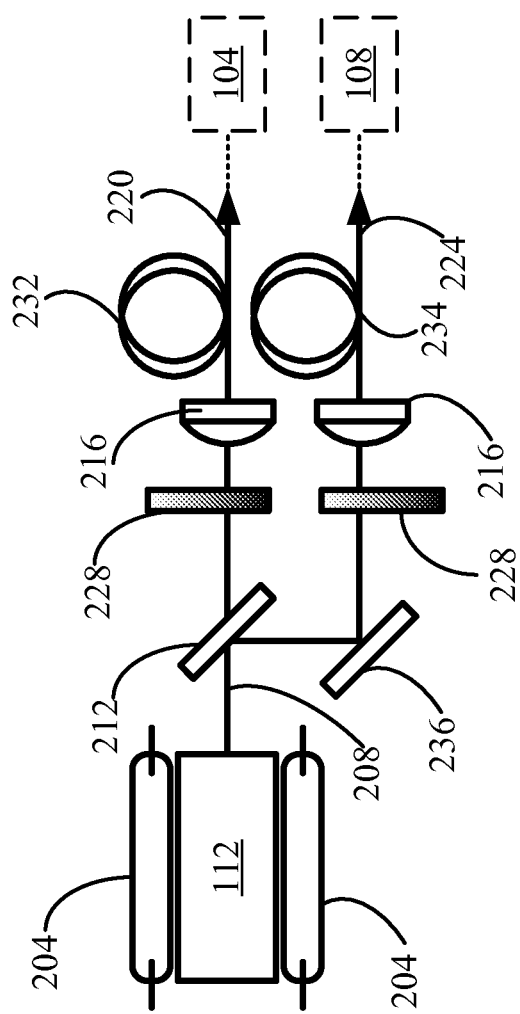
FIG. 2 is a schematic illustration of a single pump laser segment of a MOPA laser system according to one exemplary embodiment.

FIG. 2 is a detailed schematic of a pump laser segment of laser system 100 of FIG. 1. As shown in the figure, laser system 100 may provide one or more flash lamps 204 to pump the pump laser 112. Pump laser 112 may operate in a pulsed mode and generate laser pulses with energies greater than 1 J and durations shorter than 0.5 msec. Typically, the pulse duration may be in the range of 100-200 μsec.

In some exemplary embodiments, pump laser 112 may be a solid state Alexandrite laser. Pump laser 112 may emit pump laser beam at a wavelength of about 755 nm. The pump laser beam emitted by pump laser 112 is delivered to seed laser and amplifier 108 through a multimode optical fiber 208. The pump laser beam may then be split into two beams via, for example, a beam splitter 212. Beam splitter 212 can be any suitable beam splitter, such as, for example, a cube beam splitter, a partial reflector, a high refractive index plate, and a fiber splice. In one exemplary embodiment, beam splitter 212 can be an uncoated sapphire plate or window. At this wavelength, sapphire has a high index of refraction of about 1.8-1.76 and could reflect about 30% of the incident laser energy. The split pump laser beams are delivered to seed laser 104 and amplifier 108 via focusing lens 216 associated with a first multimode optical fiber 232 and a second multimode fiber 234, respectively.

If the pump laser output is well polarized as is the case when the pump laser is an Alexandrite laser, the beam splitter can be a polarization beam splitter. A polarization beam splitter may allow continuous variation of the fraction of the pump laser beam that goes to seed laser 104 and to amplifier 108. Thus, use of the polarization beam splitter may facilitate the adjustment of the output energy of the MOPA system.

Pumping energy pulses generated or emitted by the solid state pump alexandrite laser 112 could be configured to provide constant energy pulses. Since the output pulse timing of a passively Q-switched seed laser depends on the intensity of the pump beam, a beam attenuator 228 can be used to set the pump laser beam intensity delivered to the seed laser, thereby setting the output pulse timing of the seed laser. In the case where it is desirable to vary the output energy of the MOPA system, a variable attenuator 228 can be used to vary the intensity of the pump beam delivered to the amplifier 108, thereby varying the amplification and the energy of the resultant MOPA output beam. Variable attenuator 228 could be operated manually or by a feedback sensor configured to adjust the pump laser beam conducted to at least one of seed laser 104 or amplifier 108 in order to maintain the pulse output energy of the MOPA system at the desired level.

When alexandrite laser is used as pump laser 112, pump laser 112 could emit laser beam that includes a plurality of transverse modes or what is generally termed as a multi-mode operation. The multimode operation of pump laser 112 could cause output laser beam quality to fluctuate during a single pulse or from pulse to pulse. Such beam quality fluctuations could have detrimental effects on the stable operation of seed laser 104 and amplifier 108. Multimode fibers employed to couple the pump laser beam to seed laser 104 and amplifier 108 may compensate for this and some other pump laser deficiencies such as spatial intensity non-uniformities.

The length of the multimode optical fiber 232 and 234 delivering pump laser beam to seed laser 104 and amplifier 108 could be selected to mode-scramble (via mode mixing in the optical fiber) the beam emitted by the pump laser such as to provide a homogenous pumping energy distribution at the output of the multimode optical fiber 220 and/or 224. Such homogenous pump laser energy distribution would render the pumping laser beams delivered to pump seed laser 104 and amplifier 108 insensitive to output beam quality fluctuations in the pump laser. Pumping of seed laser 104 and amplifier 108 by homogenized pumping beams may result in uniform gain in seed laser 104 and amplifier 108 and stable operation of the MOPA system. Pumping by a homogenized pump laser beam also provides a spatially uniform intensity output beam with no "hot spots" and prevents changes in the pump laser beam quality from effecting the operation of the MOPA laser system. Folding mirror 236 may be a regular flat mirror that folds or directs one of the pump laser beams to pump, as shown in, for example, FIG. 2, amplifier 108. In another example, the pump laser beams could be folded to pump seed laser 104 while the beam transmitted by beam splitter 212 is directed to pump amplifier 108.

MOPA laser systems with a single pump laser may be less expensive than laser systems having a separate pump laser configured to pump the seed laser and a separate pump laser configured to pump the amplifier. More important, use of a single pump laser supports automatic synchronization of the seed laser and the amplifier operation, since the same pumping laser pulse can simultaneously deliver pumping energy to the seed laser and the amplifier. This may further simplify the final product electronics and reduces the product cost.

Figure 3:
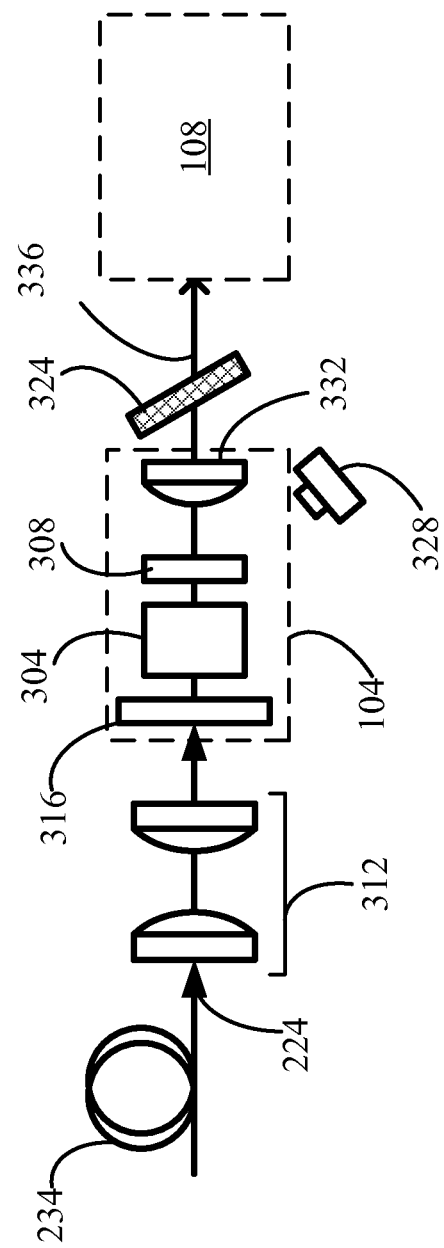
FIG. 3 is a schematic illustration of an example of a seed laser segment of the laser system of FIG. 2.

FIG. 3 is a schematic illustration of an example of a seed laser segment of laser system 100. Seed laser 104 includes at least a gain medium 304 configured to output pulsed laser light and a passive Q-switch 308. In some exemplary embodiments, gain medium 304 can be a Nd:YAG rod. A lens assembly 312 couples homogenized pumping laser beam 220 and delivers the homogenized pumping laser beam to seed laser 104 and in particular to gain medium 304. Gain medium 304 could be a Nd:YAG plate or rod that generates laser beam with wavelength of about 1064 nm. The gain length of seed laser 104 could be between 2 mm to 10 mm. The gain length of seed laser 104 could be selected to be long enough to reduce gain in transverse dimension and to reduce amplified spontaneous emission and short enough to support generation of sub-nanosecond pulses. In the case where a rod is used, and in order to reduce amplified spontaneous emission due to reflection from a barrel surface of the rod, the diameter of the Nd:YAG rod could be selected to be at least three times larger than the diameter of the pumped region. Reflection from the barrel surface can be further reduced in a number of ways. For example, by roughening the surface of the rod and by surrounding the rod with a material with a refractive index close to that of the rods which also contains a light absorber.

Mirror 316 may be highly reflective at the wavelength of 1064 nm and transparent at the wavelength of 755 nm. Mirror 332 may be a convex partial reflector at 1064 nm. Mirror 316 together with mirror 332 may form an unstable resonator configured to prevent occurrence of hot spots in seed laser 104 output beam. A saturable absorber 308, such as a Cr:YAG plate, may be used as a passive Q-switch to generate Q-switched seed laser output.

To keep the resonator length (the distance between mirrors 316 and 332) as short as possible in order to generate short output pulses, it may be advantageous to diffusion-bond saturable absorber 308 to laser rod 304, and deposit mirrors 316 and 332 directly on to the end surfaces of laser rod 304.

A saturable absorber 324 may be placed between seed laser 104 and amplifier 108. Saturable absorber 324 may be configured to prevent self-lasing in the seed laser-amplifier chain. Saturable absorber 324 could be, for example, a Cr:YAG saturable absorber or any equivalent thereof. Alternatively or additionally, a Faraday optical isolator could also be used.

A saturable absorber is an optical component that absorbs light at low light intensity levels. At high light intensity levels, a saturable absorber stops absorbing light and becomes essentially transparent after initially absorbing an amount of light for it to become saturated. A saturable absorber may be inserted between a seed laser and an amplifier to prevent self-lasing in the seed laser-amplifier chain. Before the seed laser generates its passively Q-switched laser pulse, the saturable absorber may effectively isolate the seed laser from the amplifier, thereby preventing self-lasing. It then becomes essentially transparent and transmits the seed laser pulse when the high intensity seed laser pulse impinges on it.

A first energy sensor 328 may sense the seed laser output beam energy and could be configured to provide a feedback to pump laser 112. If the pump laser beam delivered to seed laser 112 is not terminated promptly, a second, unintended pulse following the first pulse could be generated. Generation of such unintended pulse could cause some undesired effects on the workable material being treated. Energy sensor 328 may be configured to sense the output of seed laser 104 and turn off flash lamp 204 of pump laser 112 immediately as a seed laser output pulse is sensed, thereby immediately terminating the output of pump laser 112. This may insure that no unintended output pulses will be emitted. A lens 332 conveys laser beam 336 generated by seed laser 104 to amplifier 108. The output pulse energy from seed laser 104 may be about 5.0 mJ to 50.0 mJ. (Lens 332 plays a dual role. It is both a mirror and a lens. It's coated on the front surface to be a convex partial reflector for forming the laser resonator together with mirror 316. It's also a lens for the light going through it.)

In some exemplary embodiments, a seed laser pumped by a diode laser could be used. In such configuration, an Alexandrite laser could continue to be used to pump amplifier 108.

Figure 4:
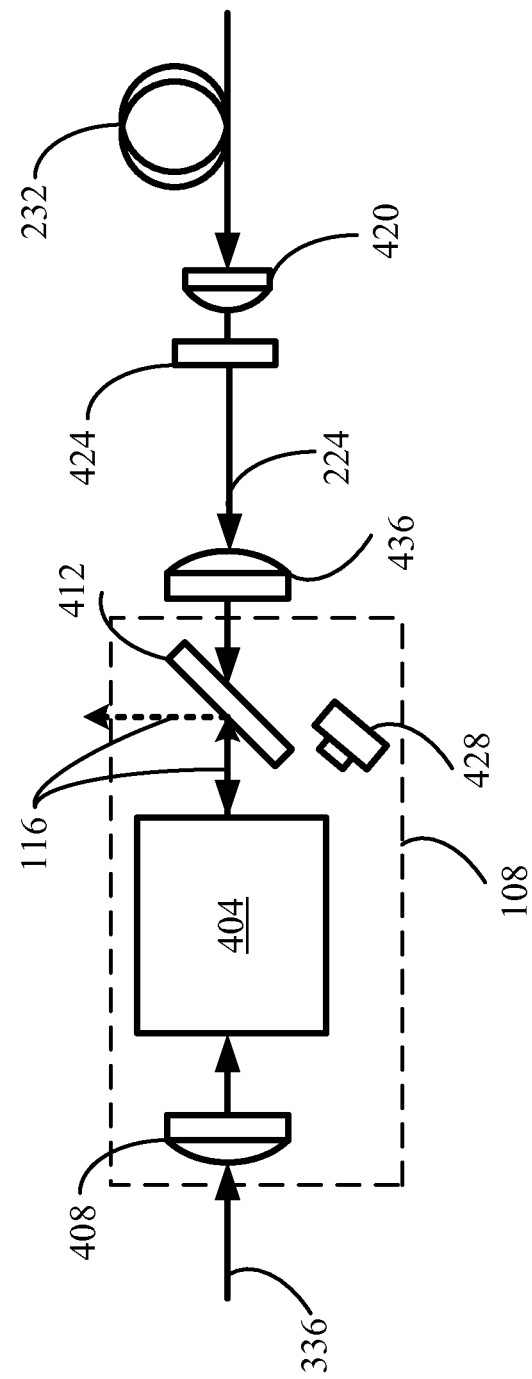
FIG. 4 is a schematic illustration of an example of an amplifying device segment of the laser system of FIG. 2.

FIG. 4 is a schematic illustration of an amplifier segment of laser system 100 according to an exemplary embodiment. Amplifier 108 may include a Nd:YAG rod 404, a coupling lens 408 configured to couple laser beam 336 generated by seed laser 104 to Nd:YAG rod 404, and a dichroic minor 412 configured to reflect a laser beam 116 amplified by amplifier 108 and transmit a laser pump beam 224 generated by pump laser 112. Seed laser beam 336 may be amplified in amplifier 108 in a single pass. In this case, seed laser beam 336 and pump laser beam 224 may be counter-propagating in the Nd:YAG rod of amplifier 108. As noted above, pump laser 112 (FIG. 1) may provide pumping energy simultaneously to both seed laser 104 and amplifier 108. The delay in emission of laser beam 336 by seed laser 104 is sufficient to allow the gain to build up in the Nd:YAG rod 404 of amplifier 108 for optimal amplification of the laser energy pulses generated by seed laser 104.

Nd:YAG rod 404 of amplifier 108 could be a ceramic laser rod with a graded Neodymium concentration to support co-propagation mode of operation, where seed laser beam 336 and laser pump beam 224 propagate in the same direction in amplifier 108. This mode of operation can be used in the case, where amplifier pump beam 336 and seed laser beam 224 are delivered to amplifier 108 by the same fiber. In this arrangement, by having the Neodimium concentration higher towards the output end of rod 404, the gain can be increased to compensate for the decrease in pump beam intensity. The diameter of Nd:YAG rod 404 could be significantly larger than the diameter of the Nd:YAG rod 404 pumped region, however the cost of a large diameter rod can be an issue. The rod diameter could be 1 to 1.2 mm. Such relatively large diameter of Nd:YAG rod 404 can be selected in order to minimize ASE caused by reflections from a barrel surface of Nd:YAG rod 404. ASE can also be minimized by making the Nd:YAG rod surface rough, or by coating the rod with material that absorbs light at the 1064 nm wavelength, and by using 1064 nm light absorbing materials to make the housing for the rod. The amplifier generates an output laser beam 116 at a wavelength of 1064 nm. In some exemplary embodiments, the emission may be in a pulse mode with an output laser pulse energy of 0.1 J to 5 J. The pulse duration may be from 10 psec to 900 psec. The gain value of amplifier may be between 5.0 to 100.0 and in some instances could exceed the 100.0 value.

In the case where it is desirable to have the seed laser beam and the amplifier pumping beam to be co-propagating in the Nd:YAG rod 404 as it is the case when the seed laser beam and the amplifier pumping beam are delivered to the amplifier using the same delivery fiber, the pump beam intensity towards the output end of the amplifier rod 404 will be low due to absorption of the pump beam in the amplifier rod and to the divergence of the pump beam. This may result in lower gain output end of the rod. In this case one can use a ceramic laser rod with a graded Neodymium concentration along its length such that the Neodymium concentration can be higher at the output end of the rod than at the input end. This will increase the gain at the output end of the rod. The amplifier generates an output laser beam 116 at a wavelength of 1064 nm. Typically, the emission is in pulse mode with output laser pulse energy of 0.1 J to 5 J. The pulses duration may be from 10 psec to 900 psec. The energy gain value of amplifier may be between 5.0 to 100.0 and in some instances could exceed the 100.0 value.

Amplifier 108 may further include a second laser energy sensor 428 configured to sense laser energy emitted by amplifier 108. As shown in FIG. 4, laser energy sensor 428 may sense the amplifier output pulses and could be configured to provide a feedback to pump laser 112 or variable attenuator 228 and act to set a proper pump energy to generate the desired output pulse energy.

If the single pump laser beam delivered to both the seed laser and the amplifier (to the MOPA) is not terminated promptly, a second unintended pulse following the first pulse generated by the MOPA could be generated. Generation of such unintended pulse could cause some undesired effects to work material 520 (see FIG. 5). For example, in case of a skin treatment, it could cause excessive injury to a patient's skin. In case of material processing, it could remove or add some undesired material thickness. Second laser energy sensor 428 may be configured to sense the output of the MOPA laser and turn off the flash lamp of the pump laser immediately to prevent the unintended generation of a second pulse in one pump laser pulse.

FIG. 4 also illustrates amplifier 108 pump laser segment. A relay lens system comprising lenses 420 and 436 may be configured to convey and couple pumping laser beam 224 to Nd:YAG rod 404. Generally, the amplifier pumping beam is provided in pulses with duration of about 100-250 microsecond and pulse energy in the range of 1 to 10 J. A dichroic minor 424 may be configured to transmit the pump laser beam 224 with wavelength of 755 nm and reflect the laser beam 116 generated by amplifier 108 with wavelength of 1064 nm.

Figure 5:
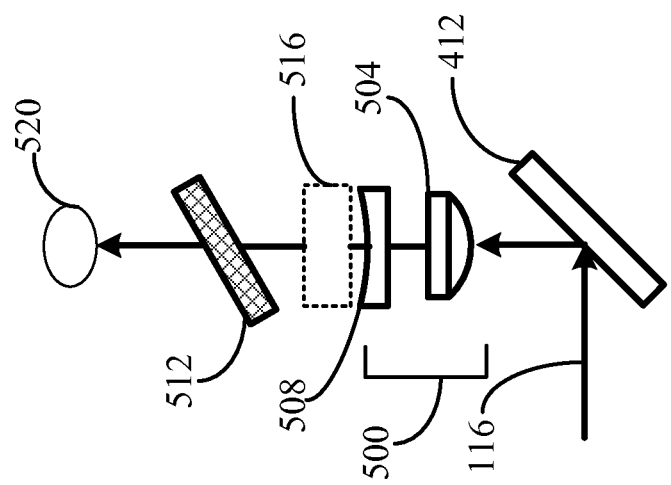
FIG. 5 is a schematic illustration of a MOPA output beam shaping and frequency multiplying segment according to one exemplary embodiment.

FIG. 5 is a schematic illustration of a MOPA emitted laser beam shaping and frequency multiplying segment according to one exemplary embodiment. The segment may include a reverse Galilean optical system 500 comprising lenses 504 and 508 and a saturable absorber 512. Optical system 500 may be configured to receive and shape to a desired diameter emitted by MOPA output laser beam 116. Saturable absorber 512 is inserted in the path of the MOPA output beam. Absorber 512 could be a Cr:YAG absorber and may be configured to minimize ASE and prevent self-lasing mode of operation that could be caused by reflections of output laser beam 116 from a work material 520. An articulated arm could be used to deliver the MOPA generated laser beam 116 to work material 520.

In some laser applications, use of additional laser wavelength could be desired. An optional frequency doubling device 516, such as for example, a KTP crystal, may be configured to receive the output laser beam 116 with wavelength of 1064 nm and double the frequency such as to produce an output laser beam with wavelength of 532 nm. Generally, an additional frequency doubling device could be placed in the path of output laser beam to produce an output laser beam with wavelength of 266 nm.

Figure 6:
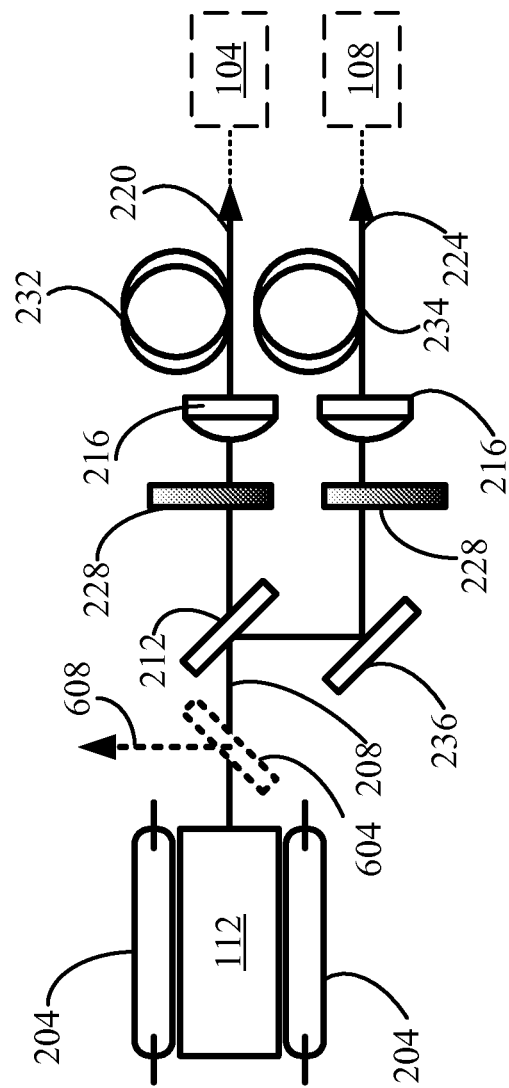
FIG. 6 is a detailed schematic illustration of a single pump laser segment of a laser system according to one exemplary embodiment.

FIG. 6 is a detailed schematic illustration of a pump laser segment of a laser system, according to one exemplary embodiment. In some instances, it could be desired, in addition to the listed above wavelengths of 1064 nm, 532 nm, and 266 nm, to have a possibility to use additional laser energy wavelengths. An optional folding mirror 604, at least partially reflecting at wavelength of 755 nm, could be inserted into optical path of the pump Alexandrite laser 112. Minor 604 could be mounted on a lever having two positions, such that, when needed, it could be introduced into the optical path of Alexandrite laser 112 emitting at a wavelength of 755 nm and deflect into a desired direction a portion or all of the pump laser beam 608. The deflected pump laser beam could be used directly for additional purposes, for example, for pumping one or more additional laser devices with different output characteristics for additional applications.

Figure 7:
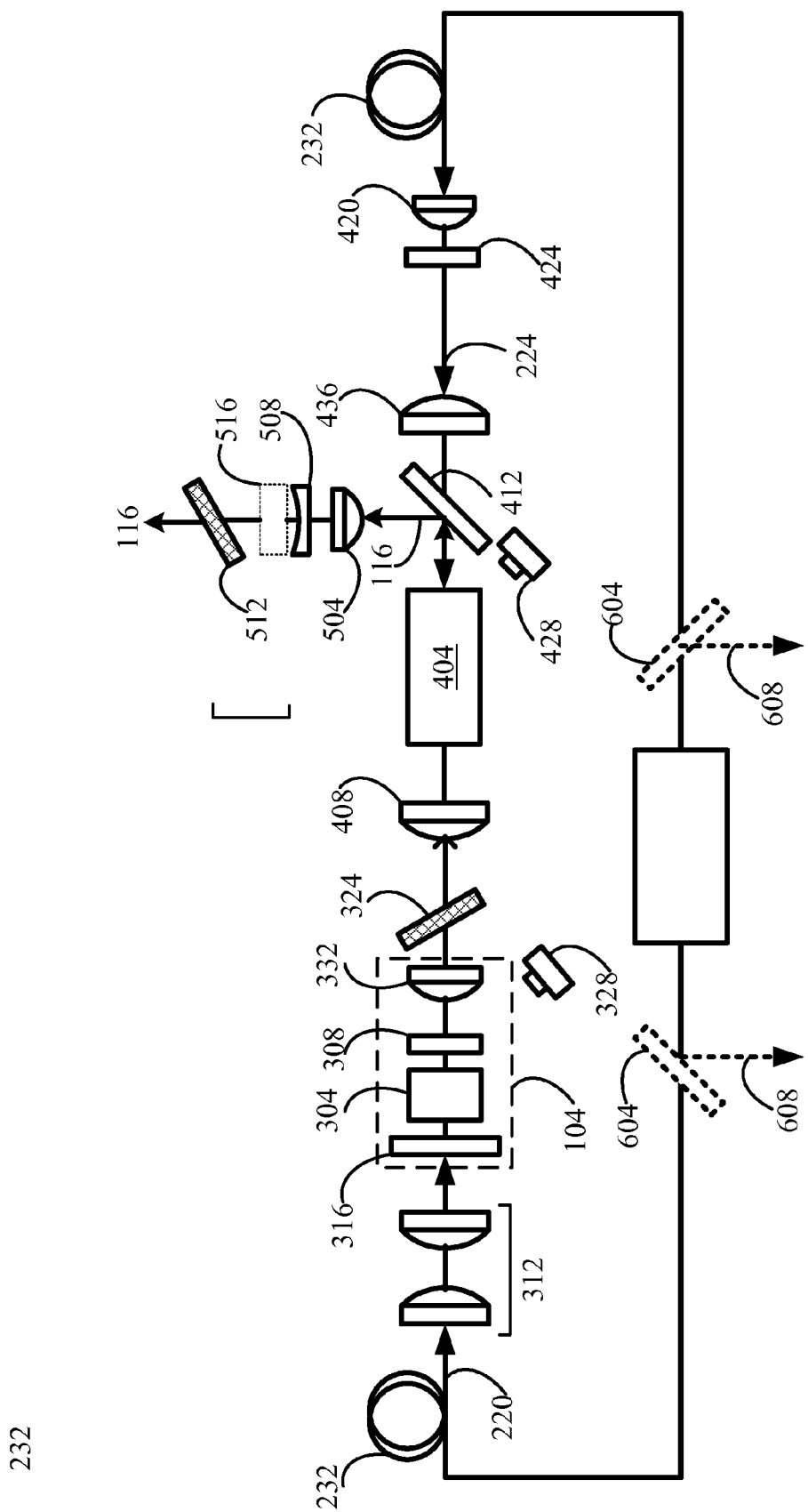
FIG. 7 is a schematic illustration of an example of an optical layout of a MOPA laser system.

FIG. 7 is a schematic illustration of an example of an optical layout of a MOPA laser system. Laser system of FIG. 7 illustrates all earlier discussed MOPA laser segments, including pump laser 112 arranged into one line. Such arrangement of the MOPA laser segments may also reduce the number of optical components required, but could be of relatively long dimensions and complicated packaging and use of the system.

Figure 8:
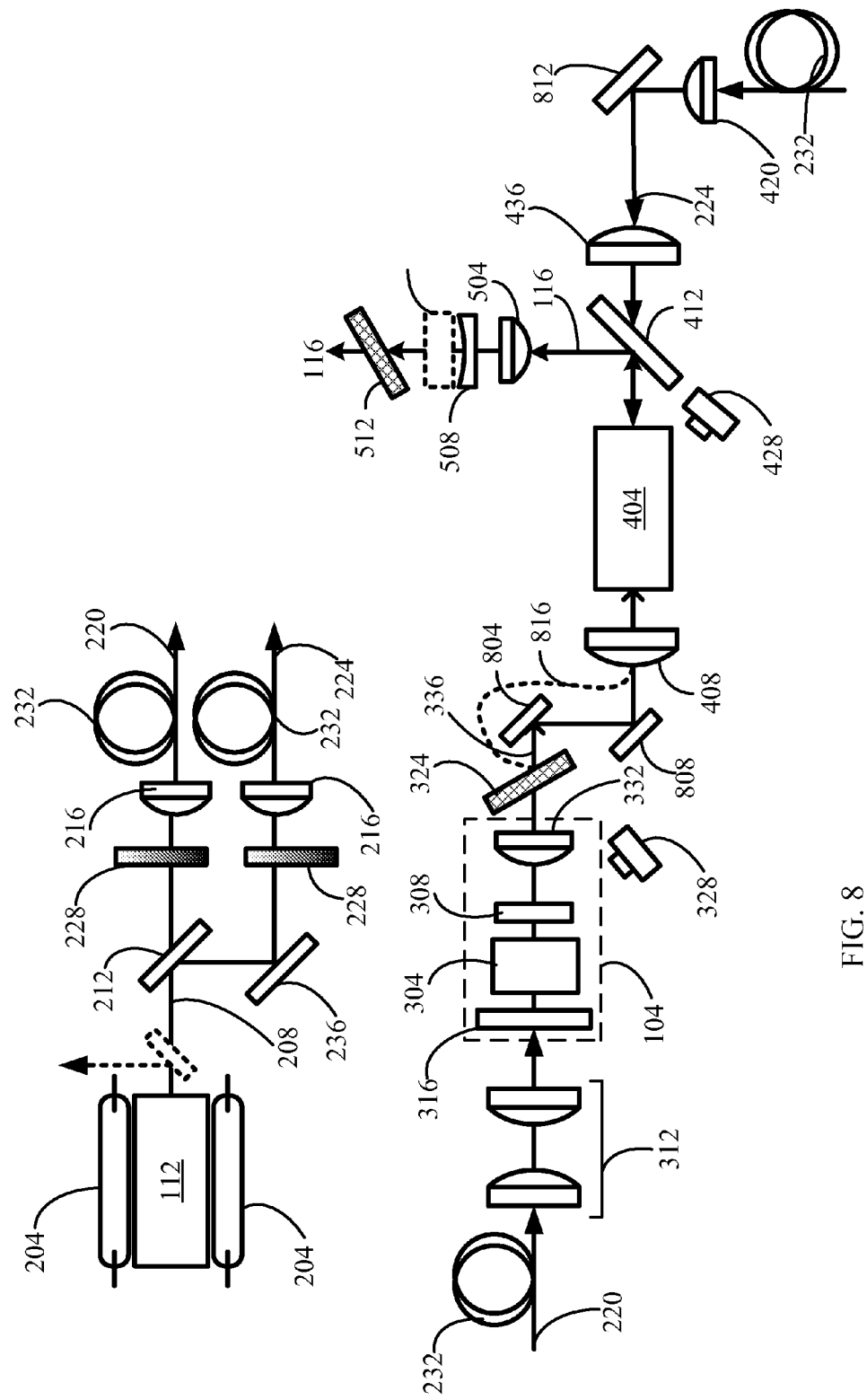
FIG. 8 is a schematic illustration of an example of an alternative optical layout of a MOPA laser system.

FIG. 8 is a schematic illustration of an example of an alternative optical layout of a MOPA laser system. Laser system of FIG. 8 includes a number of folding mirrors 804, 808, and 812. Use of folding minors may support significant dimension reduction in a MOPA laser system. In some examples, laser beam 336 generated by seed laser 104 could be coupled to amplifier 108 using a multimode optical fiber 816. Proper coupling of lenses could be introduced to collect and couple laser beam generated by seed laser 104 into fiber 816. Use of an optical fiber to couple the output of the seed laser 104 to amplifier 108 may facilitate the placement of amplifier 108 and/or the beam shaping and frequency multiplying segment (FIG. 5) in a treatment handpiece. This may further simplify the MOPA construction and eliminate the need for an articulated arm in the MOPA generated laser beam delivery system.

It should be understood that the MOPA system described above, where a pump laser is an Alexandrite laser pumped by a flash lamp and a MOPA includes a Nd:YAG seed laser and a Nd:YAG amplifier, is only one example of a device that can be made according to the principles of the present disclosure. Other pump laser and MOPA combinations could be made without departing from the teachings of the present disclosure. For example, the pump laser can be a frequency doubled Nd:YAG laser operating with an output of 532 nm wavelength, and the MOPA can include an Alexandrite seed laser and an Alexandrite amplifier.

Another example of a pump laser and MOPA combination could be a ruby laser, a Titanium Sapphire laser, a frequency doubled Nd:YAG laser, or a Cr:LiSAF laser. The MOPA gain medium could be any of the known laser materials that have pump bands at wavelengths of the pump lasers. For example, the MOPA gain medium can be Alexandrite, and the pump laser can be a frequency doubled Nd:YAG laser. In this case, the output wavelength of the MOPA will be in the range near 750 nm.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A high-energy, sub-nanosecond laser system comprising:
    an amplifier;
    a seed laser constructed and arranged to output pulsed laser light towards the amplifier, with the amplifier being constructed and arranged to amplify the pulsed laser light received from the seed laser; and
    a pump laser constructed and arranged to pump simultaneously both the seed laser and the amplifier;
    wherein the pump laser is a solid state laser pumped by at least one flash lamp and wherein the pump laser emits laser pulses with energies greater than 1J and durations shorter than 0.5 msec; and
    wherein the amplifier is constructed and arranged to generate output laser pulses of 0.1 J to 5 J and pulse duration of 10 psec to 900 psec.

2. The laser system according to claim 1, wherein the pump laser is an alexandrite laser and a laser beam emitted by pump laser is delivered to the seed laser and amplifier through a multimode optical fiber.

3. The laser system according to claim 1, wherein a laser beam is split into two laser pumping beams by an uncoated sapphire plate.

4. The laser system according to claim 1, wherein pump laser is an alexandrite laser and the pulses of the pump alexandrite laser beam emitted by the pump laser have constant energy, and further comprising a variable attenuator to adjust the pump beam energy conducted to at least the amplifier.

5. The laser system according to claim 1, further comprising a saturable absorber disposed between the seed laser and the amplifier to prevent self-lasing.

6. The laser system according to claim 1, wherein a seed laser resonator comprises an unstable resonator configured to prevent occurrence of hot spots in a seed laser output beam.

7. The laser system according to claim 6, wherein a first mirror together with a second mirror form the unstable resonator configured to prevent occurrence of hot spots in seed laser output beam.

8. The laser system according to claim 6, wherein a gain length of the seed laser is from 2 mm to 10 mm and wherein the gain length of the seed laser is selected to reduce gain in transverse dimension and to reduce amplified spontaneous emission but to be short enough to support generation of sub-nanosecond pulses.

9. The laser system according to claim 1, wherein the seed laser is a Nd:YAG rod with a diameter at least three times larger than that of pumped region dimensions and wherein the Nd:YAG rod diameter is selected to minimize amplified spontaneous emission caused by reflections from a barrel surface of the Nd:YAG rod.

10. The laser system according to claim 1, further comprising an electronic mechanism configured to ensure a single output laser pulse and terminate a flash lamp drive current in the pump laser upon optical detection of an output pulse from at least one of the seed laser and the amplifier.

11. The laser system according to claim 1, further comprising at least one laser beam frequency doubling device.

12. The laser system according to claim 1, wherein a same optical fiber is used to deliver a pulsed laser beam from the seed laser and a pump laser beam from the pump laser to the amplifier to support spatial overlap between the pulsed laser light and a pumped gain region in the amplifier.

13. A method of generating sub-nanosecond laser pulses comprising:
generating pulsed laser light using a seed laser;
directing the pulsed laser light to an amplifier;
amplifying the pulsed laser light with the amplifier;
operating a pump laser to simultaneously provide pumping energy to both the seed laser and the amplifier; and
employing an electronic mechanism configured to ensure a single output laser radiation pulse by terminating a flash lamp drive current in the pump laser upon optical detection of an output pulse from at least one of the seed laser and the amplifier.

14. The method according to claim 13, further comprising preventing a self-lasing operation mode caused by reflections of an output laser beam from a work material by employing a saturable absorber.

15. The method according to claim 13, wherein operating the pump laser comprises generating the pumping energy of greater than 1 J with a pulse duration of 100 to 200 microseconds.

16. A high-energy, sub-nanosecond laser system comprising:
a seed laser constructed and arranged to output a sub-nanosecond pulsed laser beam;
an amplifier constructed and arranged configured to receive and amplify the pulsed laser light emitted by the seed laser;
a pump laser constructed and arranged to deliver a pump laser beam to both the seed laser and the amplifier; and
a saturable absorber disposed between the seed laser and the amplifier to prevent self-lasing,
wherein the seed laser is a Nd:YAG rod and the saturable absorber is diffusion-bonded to laser rod.

17. The laser system according to claim 16, wherein to reduce resonator length and generate short pulses, the laser system further comprises laser resonator mirrors deposited directly onto end surfaces of laser rod.

18. The laser system according to claim 16, wherein the laser system is constructed and arranged to generate laser energy pulses of 0.1 to 10 J with a pulse duration of 10 to 900 psec.

19. A laser system comprising:
a seed laser constructed and arranged to output pulsed laser light;
an amplifier constructed and arranged to receive and amplify the pulsed laser light emitted by the seed laser; and
a pump laser constructed and arranged to deliver a pump laser beam to both the seed laser and the amplifier;
wherein the seed laser is a Nd:YAG rod with a diameter at least three times larger than that of pumped region dimensions; and
wherein the Nd:YAG rod diameter is selected to minimize amplified spontaneous emission caused by reflections from a barrel surface of the Nd:YAG rod.

* * * * *